(12) United States Patent
Uematsu et al.

(10) Patent No.: US 8,439,510 B2
(45) Date of Patent: May 14, 2013

(54) APPARATUS FOR VIEWING OBLIQUE FORWARD AREA OF VEHICLE

(75) Inventors: Hiroshi Uematsu, Wako (JP); Yuya Kishimoto, Wako (JP); Norio Mugikura, Wako (JP); Tomoaki Hosobe, Wako (JP); Shirena Takai, Wako (JP); Ryosuke Matsuoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 389 days.

(21) Appl. No.: 12/832,637

(22) Filed: Jul. 8, 2010

(65) Prior Publication Data
US 2011/0007411 A1 Jan. 13, 2011

(30) Foreign Application Priority Data

Jul. 10, 2009 (JP) ................................ 2009-163963
Jul. 14, 2009 (JP) ................................ 2009-165616

(51) Int. Cl.
*G02B 5/08* (2006.01)
*G02B 7/182* (2006.01)

(52) U.S. Cl.
USPC ........................... 359/855; 359/871; 359/842

(58) Field of Classification Search .......... 359/838–839, 359/849, 860, 864, 892, 890
See application file for complete search history.

(56) References Cited

U.S. PATENT DOCUMENTS

| | | | | |
|---|---|---|---|---|
| 2,210,147 A | * | 8/1940 | Griffith | 248/481 |
| 6,357,883 B1 | * | 3/2002 | Strumolo et al. | 359/857 |
| 6,361,849 B1 | * | 3/2002 | Shukuri et al. | 428/141 |
| 7,237,913 B2 | * | 7/2007 | Duroux et al. | 359/838 |

FOREIGN PATENT DOCUMENTS

| | | | |
|---|---|---|---|
| GB | 2208633 A | * | 4/1989 |
| JP | 2004-255915 | | 9/2004 |
| JP | 2004255915 A | * | 9/2004 |
| JP | 2005-199844 | | 7/2005 |
| JP | 2006-231998 | | 9/2006 |
| JP | 2007-083981 | | 4/2007 |
| JP | 2009-064265 | | 3/2009 |
| JP | 2009-173246 | | 8/2009 |

\* cited by examiner

*Primary Examiner* — Scott J Sugarman
*Assistant Examiner* — Robert E Tallman
(74) *Attorney, Agent, or Firm* — Rankin, Hill & Clark LLP

(57) ABSTRACT

An apparatus for viewing an oblique forward area of a vehicle whereby light incident from outside a passenger compartment is prevented from reflecting. The apparatus includes a sub-window pane supported by a front pillar and a sub-pillar, a mirror housing of a door mirror for displaying a rear of the vehicle, and a first reflective mirror for displaying an area in front and to one side of the vehicle. The first reflective mirror is provided to the mirror housing. The apparatus also includes a second reflective mirror for reflecting the light reflected by the first reflective mirror toward a driver. The sub-window pane is disposed further toward the outside in a vehicle widthwise direction than a line passing over cross-sectional vehicle-widthwise direction centers of the front pillar and the sub-pillar. An outside edge of the second reflective mirror is positioned in the vicinity of the sub-window pane.

14 Claims, 16 Drawing Sheets

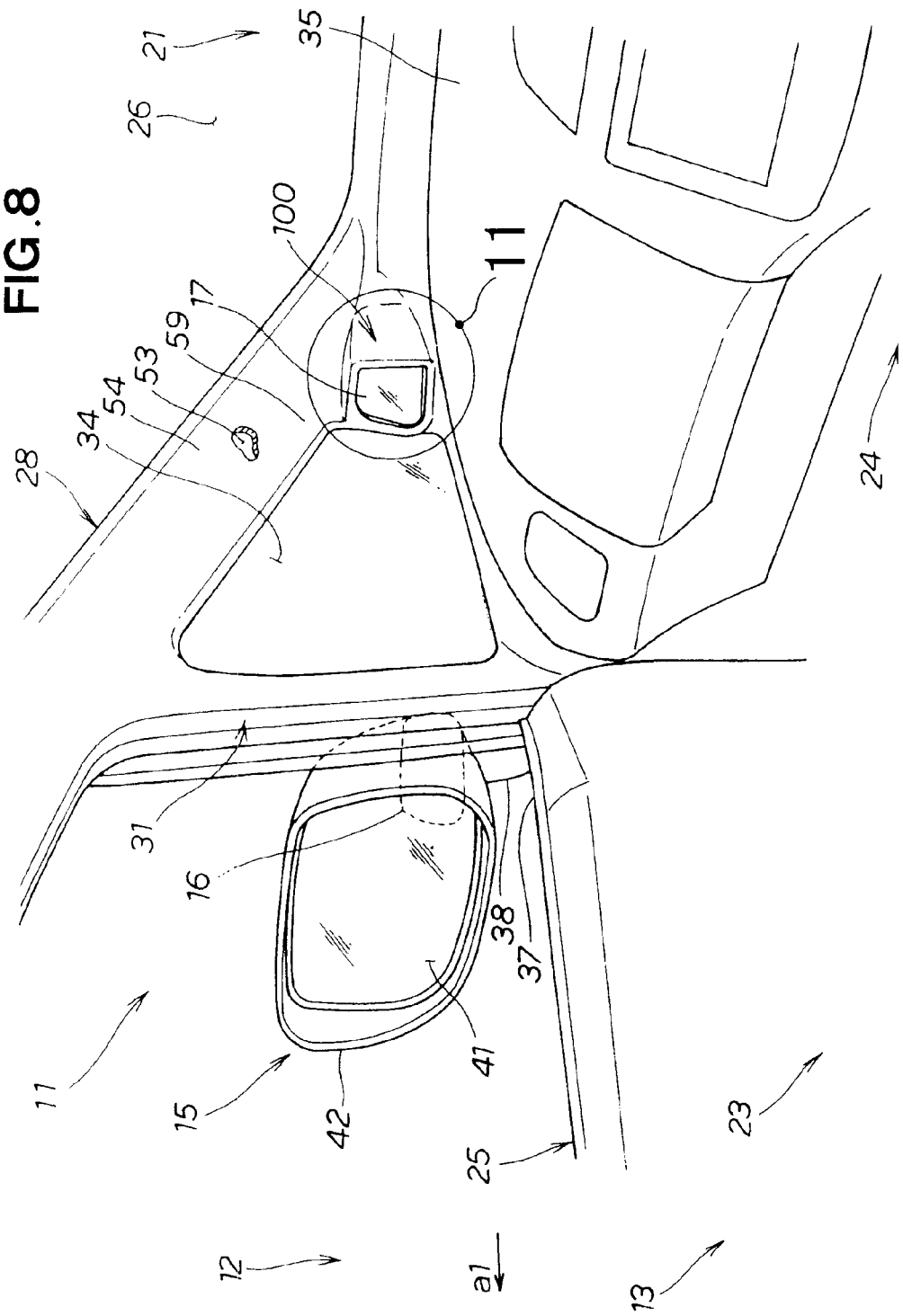

APPARATUS FOR VIEWING OBLIQUE FORWARD AREA OF VEHICLE

FIELD OF THE INVENTION

The present invention relates to an apparatus for viewing an oblique forward area of a vehicle.

BACKGROUND OF THE INVENTION

Mirrors and cameras have been used as apparatuses for viewing an area in front and to one side (oblique forward area) of a vehicle. Viewing apparatuses using mirrors are disclosed in Japanese Patent Application Laid-Open Publication No. 2004-255915 (JP-A 2004-255915) and are proposed in Japanese Patent Application No. 2008-16636 (Laid-Open Publication No. JP-A 2009-173246), for example.

In the viewing apparatus disclosed in JP-A 2004-255915, a first mirror for displaying an area in front and to one side of a vehicle is provided to a sub-pillar that forms a triangular sub-window, an image displayed by the first mirror is reflected toward a second mirror provided to a front pillar, and the driver sees the image displayed in the second mirror. The driver can therefore view the area in front and to one side of the vehicle via the second mirror.

However, in the viewing apparatus disclosed in JP-A 2004-255915, it is impossible to view a front body as well as the lateral area in the vicinity of the front body and the area in the vicinity of the front wheels. Moreover, the second mirror is viewed by the driver directly, and the direction (angle) thereof can be adjusted as needed, but this angle adjustment takes time.

The viewing apparatus proposed in JP-A 2009-173246 is configured so that a first reflective mirror used to display an area in front and to one side of a vehicle is provided to a mirror housing in which a mirror body is accommodated, and an image displayed in the first reflective mirror is reflected toward a second reflective mirror provided to the surface of the front pillar in the interior of the passenger compartment. The driver can view the area in front and to one side of the vehicle displayed in the second reflective mirror.

However, in the viewing apparatus according to Japanese Patent Application No. 2008-16636, light from the position of the sun, other vehicles, building, street lights, and other sources may be reflected by the second reflective mirror, causing the driver discomfort and difficulty seeing.

Moreover, the objects adjacent to the second reflective mirror, e.g., the left end portion of the instrument panel and the adhesive (e.g., black ceramic paste) applied to the end portions of the sub-window pane provided between the second reflective mirror and the first reflective mirror, are shown in the second reflective mirror and the range of visibility for the driver is restricted.

Furthermore, the mirror housing to which the first reflective mirror is provided is sometimes shown in the second reflective mirror along with the image of the area in front of and to one side of the vehicle, and light from the headlights of vehicles to the rear may be directly incident on the second reflective mirror from the periphery of the mirror housing.

SUMMARY OF THE INVENTION

It is an object of the present invention to provide an apparatus for viewing an oblique forward area of a vehicle that is configured so as to eliminate discomfort to the driver by preventing reflection of light incident from outside the vehicle, maintain the visibility range of the second reflective mirror, prevent interference between the reflected light of the first reflective mirror and one end portion of the instrument panel, and prevent interference between the reflected light of the first reflective mirror and the black ceramic paste.

According to an aspect of the present invention, there is provided an apparatus for viewing an oblique forward area of a vehicle, which comprises: a sub-window pane, supported by a front pillar of the vehicle and a sub-pillar extending downwardly from partway along the front pillar, for separating an inside and outside of a passenger compartment; a mirror housing disposed in a vicinity of the sub-window pane and housing a door mirror for displaying a rear of the vehicle; a first reflective mirror, provided on a front surface of the mirror housing, for displaying the oblique forward area of the vehicle; and a second reflective mirror, disposed on a surface of the front pillar exposed to an interior of the passenger compartment, for displaying the oblique forward area of the vehicle by reflecting light reflected by the first reflective mirror toward a vehicle occupant through the sub-window pane, wherein the sub-window pane is disposed further outward in a vehicle widthwise direction than a line passing over cross-sectional vehicle-widthwise direction centers of the front pillar and the sub-pillar, and the second reflective mirror has an outside edge positioned in a vicinity of the sub-window pane.

Therefore, the second reflective mirror is close to the first reflective mirror, and the distance thereof to the first reflective mirror is small, and the tilt angle thereof toward the first reflective mirror outside the vehicle can be reduced. As a result, light incident on the second reflective mirror from outside the vehicle can be prevented from reflecting, and discomfort to the driver can be prevented.

Preferably, the sub-window pane is disposed such that an external surface of the sub-window pane is substantially flush with an external surface of the front pillar and an external surface of the sub-pillar. Thus, the distance from the first reflective mirror to the second reflective mirror can be further reduced, and it is possible to further reduce the angle of tilt of the second reflective mirror toward the first reflective mirror outside the vehicle. In other words, it is possible to prevent reflection of light incident on the second reflective mirror from outside the vehicle.

Desirably, the second reflective mirror has an inside edge positioned further inward in the vehicle widthwise direction than the outside edge, the inside edge being positioned further inward in the vehicle widthwise direction than the line passing over the cross-sectional vehicle-widthwise direction centers of the front pillar and the sub-pillar. Thus, the visibility range of the second reflective mirror can be maintained while keeping the second reflective mirror close to the first reflective mirror.

In a preferred form, the second reflective mirror is disposed at a height substantially equal to the height of the first reflective mirror. Thus, the first reflective mirror can be disposed facing slightly downward or substantially vertically, the first reflective mirror does not readily reflect light incident from above the vehicle toward the second reflective mirror, and discomfort to the driver can be suppressed. Moreover, when the second reflective mirror is disposed facing upward, the second reflective mirror sometimes reflects light incident from above the vehicle toward the driver, but disposing the second reflective mirror facing slightly downward or substantially vertically enables driver discomfort to be suppressed.

Preferably, the front pillar is disposed on left and right sides of the vehicle, and an instrument panel is disposed between the left and right front pillars, at least one end portion of the instrument panel located closely to a front passenger seat being positioned so as not to interfere with reflected light traveling from the first reflective mirror to the second reflective mirror. Thus, depending on the design of the vehicle and other factors, it is possible to prevent interference between the reflected light of the first reflective mirror and one end portion of the instrument panel that occurs due to placing the second reflective mirror at substantially the same height as the first reflective mirror.

It is desirable that the front pillar be disposed on left and right sides of the vehicle, and an instrument panel be disposed between the left and right front pillars, at least one end portion of the instrument panel located closely to a front passenger seat being formed so as to be lower in a vertical direction than a vehicle-widthwise direction center portion of the instrument panel and being positioned at a height so as not to interfere with reflected light traveling from the first reflective mirror to the second reflective mirror. Thus, depending on the design of the vehicle and other factors, it is possible to prevent interference between the reflected light of the first reflective mirror and one end portion of the instrument panel that occurs due to placing the second reflective mirror at substantially the same height as the first reflective mirror. An existing structure can also be utilized, except for at least one end portion of the instrument panel.

It is preferred that a black ceramic paste be provided to a peripheral edge portion of the sub-window pane, the black ceramic paste being baked so as not to interfere with reflected light traveling from the first reflective mirror to the second reflective mirror. Thus, depending on the design of the vehicle and other factors, it is possible to prevent interference between the reflected light of the first reflective mirror and the black ceramic paste that occurs due to placing the second reflective mirror at substantially the same height as the first reflective mirror. In other words, by preventing interference, the black ceramic paste is not displayed in the second reflective mirror.

According to another aspect of the present invention, there is provided an apparatus for viewing an oblique forward area of a vehicle, which comprises: a sub-window pane supported by a front pillar of the vehicle and a sub-pillar extending downward from partway along the front pillar, the sub-window pane separating an inside and outside of a passenger compartment; a mirror housing disposed in a vicinity of the sub-window pane and housing a door mirror for displaying a rear of the vehicle; a housing mirror, provided on a front surface of the mirror housing, for displaying the oblique forward area of the vehicle; and a pillar mirror mechanism having a pillar mirror, provided on that surface of the front pillar which is exposed to an interior of the passenger compartment, for displaying the oblique forward area of the vehicle by reflecting light reflected by the housing mirror toward a vehicle occupant via the sub-window pane, wherein the pillar mirror mechanism comprises a pillar mirror housing disposed on a surface of the front pillar in the interior of the passenger compartment, and a mirror holder, attached to inside of the pillar mirror housing, for retaining the pillar mirror, the mirror holder is provided with a boss part that protrudes toward the inside of the pillar mirror housing, and the boss part has an adjustment margin whereby an angle of the retained pillar mirror is adjusted by adjusting a protrusion length of the boss part.

Even when the range displayed by the pillar mirror is misaligned due to variation of the shape during resin molding of the instrument panel and the front pillar interior member of the front pillar, or variation during assembly of the front pillar interior member with the front pillar body, the protrusion length of the boss part can be varied by the adjustment margin provided to the boss part, and the mounting angle of the pillar mirror can be adjusted. The boss part also specifies the direction of the pillar mirror and simplifies adjustment of the angle of the pillar mirror.

Preferably, at least two boss parts are formed, and the two boss parts are disposed in positions so as to be point-symmetrical about an intersection of a horizontal center line and a vertical center line of the mirror holder. For example, when two boss parts are disposed in positions so as to be point-symmetrical about a diagonal of the mirror holder, and the protrusion length is small in the lower right boss part as one of the boss parts, the lower right of the pillar mirror swings toward the inside the pillar mirror housing, and the angle of the pillar mirror can be adjusted. When the protrusion length is small in the upper left boss part as the other boss part, the upper left of the pillar mirror swings toward the inside of the pillar mirror housing, and the angle of the pillar mirror can be adjusted. In other words, since the pillar mirror tilts in only one direction or the other direction, the angle of the pillar mirror can be adjusted by a simple operation.

Desirably, the pillar mirror is divided into four areas designated as an upper right area, a lower right area, an upper left area and a lower left area, and one boss part is disposed in the mirror holder so as to correspond to the lower right area while other boss part is disposed in the mirror holder so as to correspond to the upper left area.

Therefore, when the protrusion length of one boss part is adjusted (reduced), the angle of the pillar mirror can be adjusted in two directions simultaneously (diagonal direction). For example, when the one boss part of the lower right area is lowered, the lower right area tilts toward the inside of the pillar mirror housing, and the rightward angle and the downward angle can be simultaneously adjusted. In other words, the pillar mirror can be tilted in the lower right diagonal direction, and conversely, the pillar mirror can be tilted in the upper left diagonal direction by using the other boss part in the upper left area. Since one boss part is disposed in the lower right area and the other boss part is disposed in the upper left area, the movement path of the pillar mirror determined by the height of the boss parts coincides with the path of rotation along which the pillar mirror moves when used by a large person or a small person, and the angle (direction) of the pillar mirror is easily adjusted.

In a preferred form, the pillar mirror housing is provided with an open portion having a peripheral edge portion substantially flush with a reflective surface of the pillar mirror. Therefore, the reflective surface of the pillar mirror and the peripheral edge portion of the open portion are substantially flush when the pillar mirror is fitted in the open portion, and the appearance thereof is enhanced. When the angle (direction) of the pillar mirror is adjusted, no large gaps form between the pillar mirror and the open portion, and the appearance is not adversely affected.

The pillar mirror housing is preferably black. When the pillar mirror housing is black, even when a gap is set between the pillar mirror and the open portion, the gap is difficult to notice when adjusting the angle (direction) of the pillar mirror. It is also possible to prevent the light reflected by the pillar mirror housing from impairing visibility, and also to prevent reflection onto the pillar mirror housing.

Preferably, the pillar mirror or the pillar mirror housing is provided with visible range displaying means for notifying a vehicle occupant of a visible range of the oblique forward area of the vehicle viewed via the housing mirror. The driver can therefore be notified of the visible range displayed by the housing mirror and the pillar mirror.

BRIEF DESCRIPTION OF THE DRAWINGS

Certain preferred embodiments of the present invention will be described in detail below, by way of example only, with reference to the accompanying drawings, in which:

FIG. 6A is a view showing a second reflective mirror with a large amount of a black ceramic paste displayed therein, while

FIG. 7A is a view showing an example of the second reflective mirror with a large display area, while

FIG. 8 is a view showing the vehicle with the oblique forward viewing apparatus according to the first embodiment, as seen from inside the passenger compartment;

DETAILED DESCRIPTION OF THE PREFERRED EMBODIMENTS

First Embodiment

Figure 1:
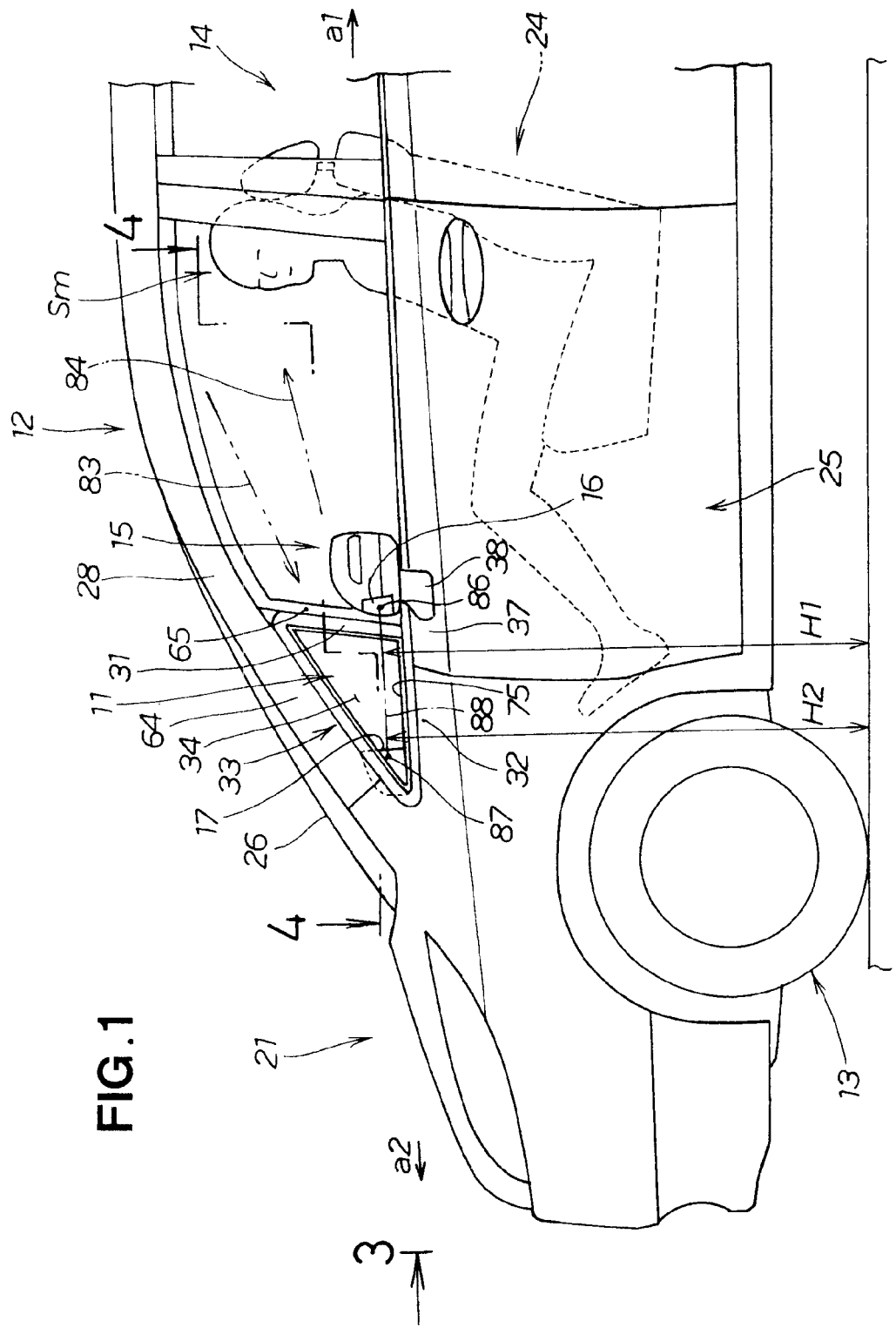
FIG. 1 is a side elevational view showing a vehicle employing an oblique forward area viewing apparatus according to a first embodiment of the present invention.

An apparatus 11 for viewing an oblique forward area of a vehicle according to a first embodiment is used by a driver to view the vicinity of a left front wheel 13 of a vehicle 12, i.e., the area in front and to the left side, and an image displayed in a first reflective mirror (housing mirror) 16 provided to a door mirror 15 on the outside of a passenger compartment 14 is displayed in a second reflective mirror (pillar mirror) 17 on the inside of the passenger compartment 14.

As shown in FIGS. 1 through 4, the vehicle 12 includes a front pillar 28 for supporting the left and right ends of a front pane 26, a sub-pillar 31 extending downward from a midpoint on the front pillar 28, a center pillar portion 32 extending toward the front of the vehicle from the lower end of the sub-pillar 31, a sub-window pane 34 supported by the sub-pillar 31 and the front pillar 28, and the apparatus 11 for viewing an area in front and to one side of the vehicle.

A front triangular open portion 33 is formed by the front pillar 28, the sub-pillar 31, and the center pillar portion 32. The sub-window pane 34 is fitted in the front triangular open portion 33.

Reference numeral 21 is a front body, 23 is a passenger seat, 24 is a driver seat, 25 is a left front door, and 33 is an instrument panel.

The door mirror 15 is on the exterior of the passenger compartment 14, and is attached to a support part 38, which is itself attached to a front upper part 37 of the left front door 25. The door mirror 15 includes a mirror body 41 for displaying an image of the rear of the vehicle 12 (along arrow a1), and a mirror housing 42 for accommodating and supporting the mirror body 41.

The support part 38 supports the mirror housing 42 so that the mirror housing 42 can rotate, i.e., so that the mirror housing 42 can be folded toward the side of the vehicle body. The mirror housing 42 is manufactured from a plastic material that is molded in a box-shape, has a front wall part (front surface) 43 facing the front of the vehicle 12 (along arrow a2), and also has an interior part 44 extending to the front side part 43, and an exterior part 45. The first reflective mirror 16 is provided integrally with a lower part 47 of the front side part 43.

The first reflective mirror 16 is a convex mirror, and the radius of the convex surface and the orientation of the convex surface are set so that the area in front and to the left side of the vehicle (see FIG. 5) of the vehicle 12 is displayed in the second reflective mirror 17. The second reflective mirror 17 is a flat mirror.

The apparatus 11 for viewing an area in front and to one side of a vehicle according to the present embodiment will next be described with reference to FIGS. 1 through 4.

The viewing apparatus 11 is provided with the sub-window pane 34; the mirror housing 42 for accommodating and retaining the mirror body 41 of the door mirror 15 for displaying the area to the rear of the vehicle 12; the first reflective mirror 16 provided to the front surface (front wall part) 43 of the mirror housing 42 so as to display a first object 51 (FIG. 5) and a second object 52 (FIG. 5) in a range extending from an area to one side of the vehicle 12 to an area in front of the vehicle 12; and the second reflective mirror 17 provided to an interior member 54 of the front pillar 28 and used for displaying the first object 51 and the second object 52 by reflecting the light reflected by the first reflective mirror 16 toward the a vehicle occupant (driver) Sm. The sub-window pane 34 is disposed further to the outside (along arrow a3) in the width direction of the vehicle than a line 58 connecting the cross-sectional center (center point 56) of the front pillar 28 and the cross-sectional center (center point 57) of the sub-pillar 31. The second reflective mirror 17 is disposed so that an outside edge 61 thereof toward the side of the vehicle body is positioned in the vicinity of the sub-window pane 34. The light reflected by the first reflective mirror 16 is passed by the sub-window pane 34 and is incident on the second reflective mirror 17.

The sub-window pane 34 is disposed so that an external surface of the sub-window pane 34, an external surface 64 of the front pillar 28, and an external surface 65 of the sub-pillar 31 are substantially flush. The term "flush" here means that there is an allowable level difference of 2 mm to 4 mm.

An inside edge 67 of the second reflective mirror 17, positioned opposite the outside edge 61 and toward the center in the vehicle width direction, is positioned further toward the center in the width direction of the vehicle than the line 58 passing through the sectional center 56 of the front pillar 28 in the width direction of the vehicle and the sectional center 57 of the sub-pillar 31 in the width direction of the vehicle.

As shown in FIG. 1, the height H2 of the second reflective mirror 17 is substantially equal to the height H1 of the first reflective mirror 16. However, the heights H1, H2 of the first and second reflective mirrors 16, 17 range from the upper limit to the lower limit of a tolerance, and specifically, the height H2 of the second reflective mirror 17 may be about 5 mm to 70 mm greater than the height H1 of the first reflective mirror 16. The size of the second reflective mirror 17 is such that substantially the entire first reflective mirror 16 is displayed.

The second reflective mirror 17 is adapted so that the angle thereof in the vertical direction can be adjusted. Specifically, the position (angle) at which the second reflective mirror 17 is substantially vertical is the upward limit position of the second reflective mirror 17, and the position (angle) at which the second reflective mirror 17 is inclined downward at the desired angle is the downward limit position of the second reflective mirror 17. The second reflective mirror 17 is thus supported by an adjustment mechanism (not shown) that enables the direction thereof to be adjusted.

The first reflective mirror 16 is fixed to the mirror housing 42 in a vertical or downward-facing orientation. The first reflective mirror 16 is designed so that the first object 51 and second object 52 are displayed in the second reflective mirror 17 for the entire range of adjustment of the second reflective mirror 17 from the upward limit position to the downward limit position.

Figure 2:
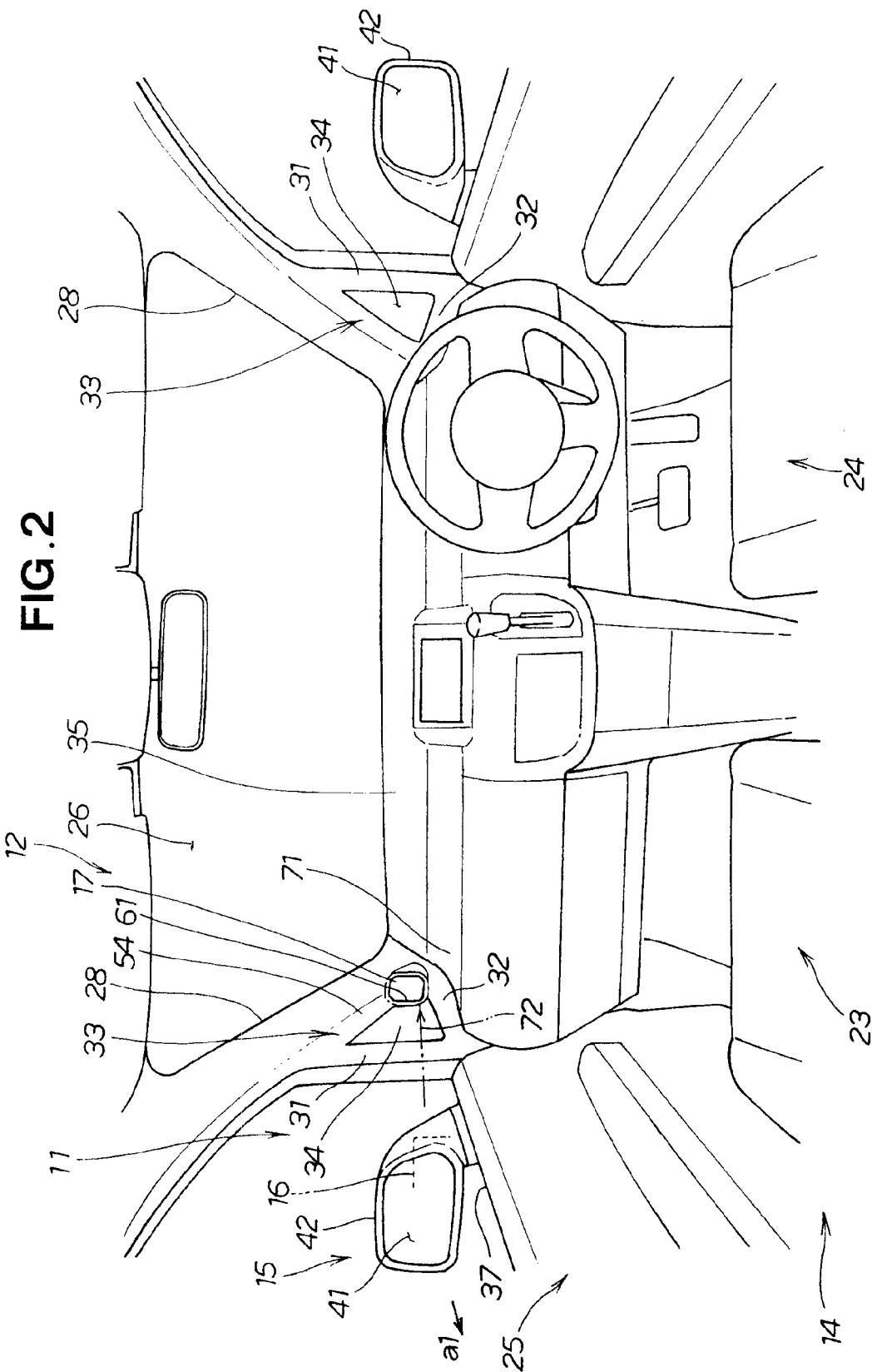
FIG. 2 is a view of the vehicle employing the oblique forward area viewing apparatus of FIG. 1, as seen from a passenger compartment of the vehicle.
Figure 3:
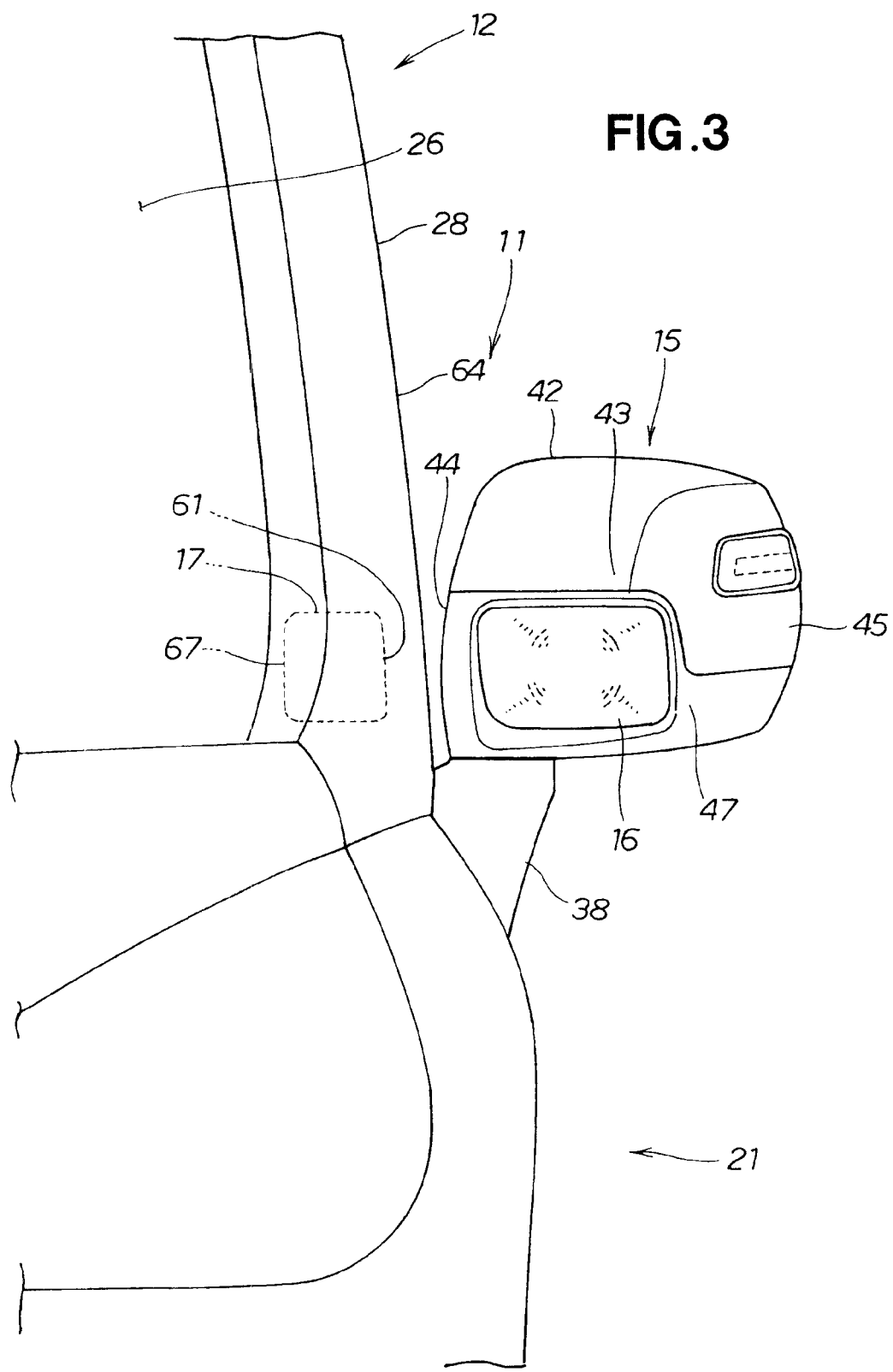
FIG. 3 is an enlarged view of the vehicle as seen in the direction of arrow 3 of FIG. 1.

As shown in FIG. 2, at least one end portion 71 of an instrument panel 35, the instrument panel 35 being disposed between left and right front pillars 28 and the one end portion 71 being positioned toward a front passenger seat 23, is positioned so as not to interfere with an optical path 72 from the first reflective mirror 16 to the second reflective mirror 17.

The instrument panel 35 is disposed between left and right front pillars 28, 28. The one end portion 71 of the instrument panel 35 on the side of the front passenger seat 23 is formed so as to be lower in the vertical direction than the center portion of the instrument panel 35 in the vehicle width direction, and positioned at a height so as not to interfere with reflected light (optical path) 72 from the first reflective mirror to the second reflective mirror.

A black ceramic paste 75 is provided to a peripheral edge portion 74 of the sub-window pane 34. The black ceramic paste 75 is applied so as not to interfere with the optical path 72 from the first reflective mirror 16 to the second reflective mirror 17.

An operation of the apparatus 11 for viewing an area in front and to one side of a vehicle according to the present embodiment will be described hereinafter with reference to FIGS. 5 through 7.

Figure 5:
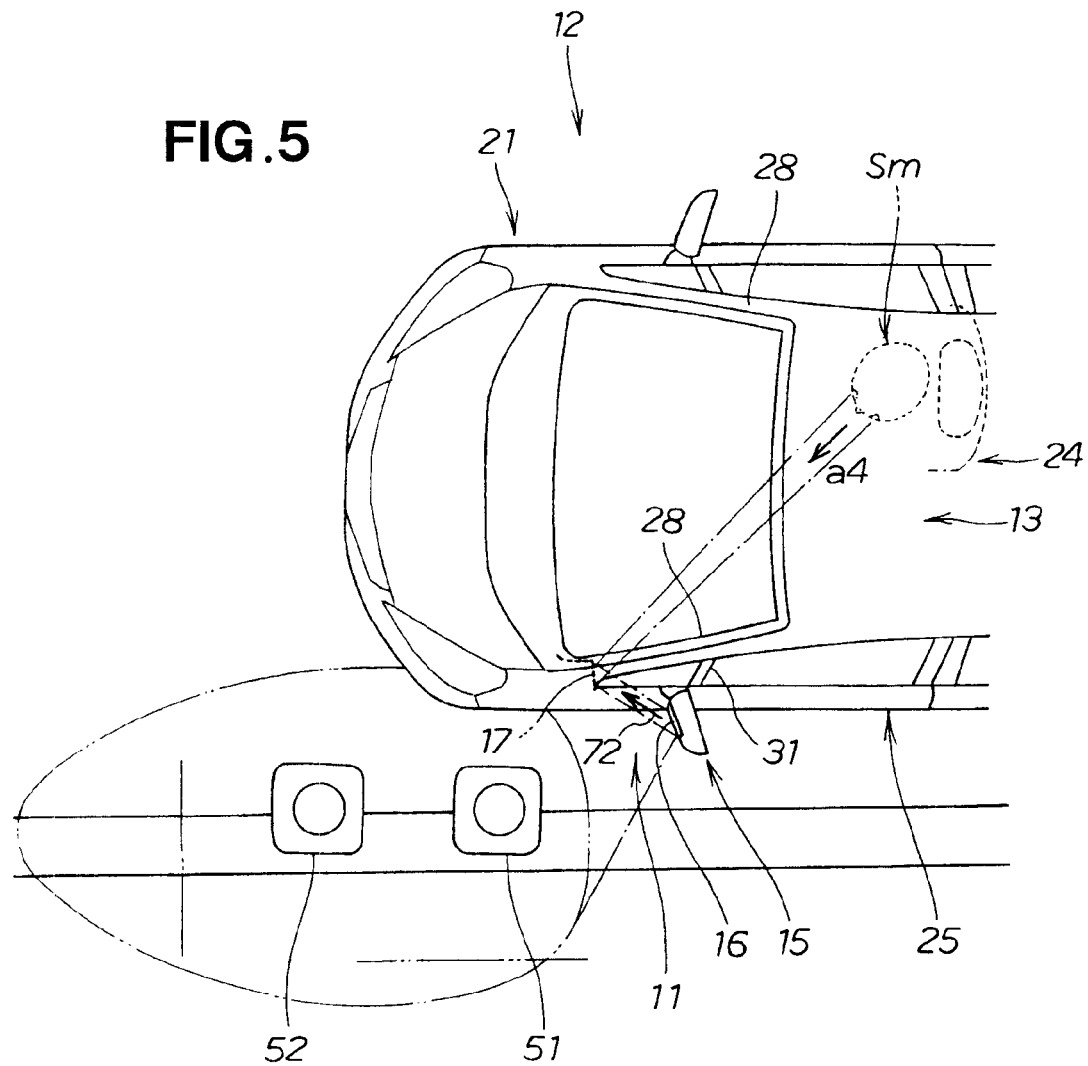
FIG. 5 is a schematic view showing a left oblique forward area of the vehicle, as seen by a driver.

As shown in FIG. 5, the first and second objects 51, 52 are positioned in the vicinity of the left front wheel, at the left front side of the vehicle 12. The driver Sm is of average body height.

Figure 6A:
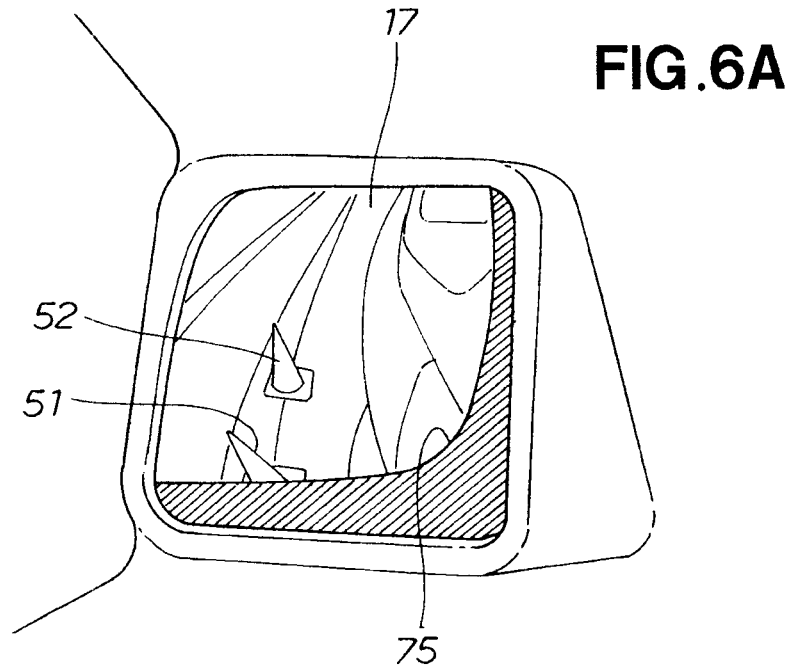
Figure 6B:
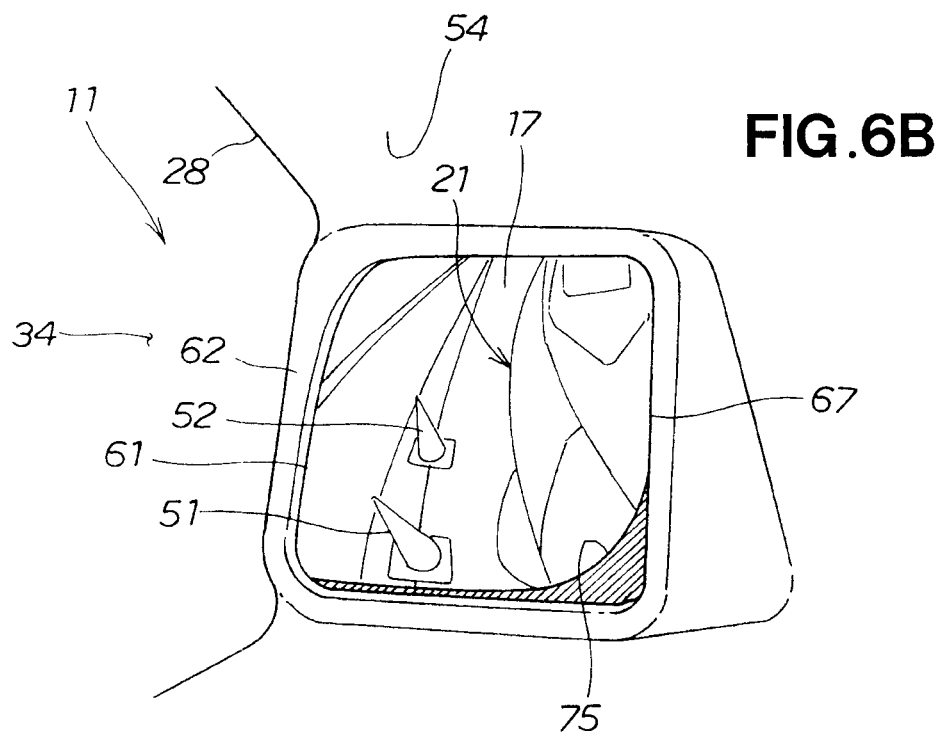
FIG. 6B is a view showing the second reflective mirror with little of the black ceramic paste displayed therein.

In the viewing apparatus 11, the driver Sm seated in the driver seat 24 is facing to the left side (along arrow a4), and light reflected from the first object 51 and the second object 52, which are in the blind-spot of the driver, arrives at the second reflective mirror 17 via the first reflective mirror 16 when the second reflective mirror 17 is viewed, as shown in FIG. 6B. The area in the blind-spot of the driver can therefore be seen in the second reflective mirror 17.

Specifically, light reflected from the first object 51 and the second object 52 is reflected by the first reflective mirror 16, and the reflected light 72 of the first reflective mirror 16 reaches the second reflective mirror 17. The driver can see the situation of the area in front and to one side of the vehicle, which had been the blind-spot area, by viewing the second reflective mirror 17.

Figure 4:
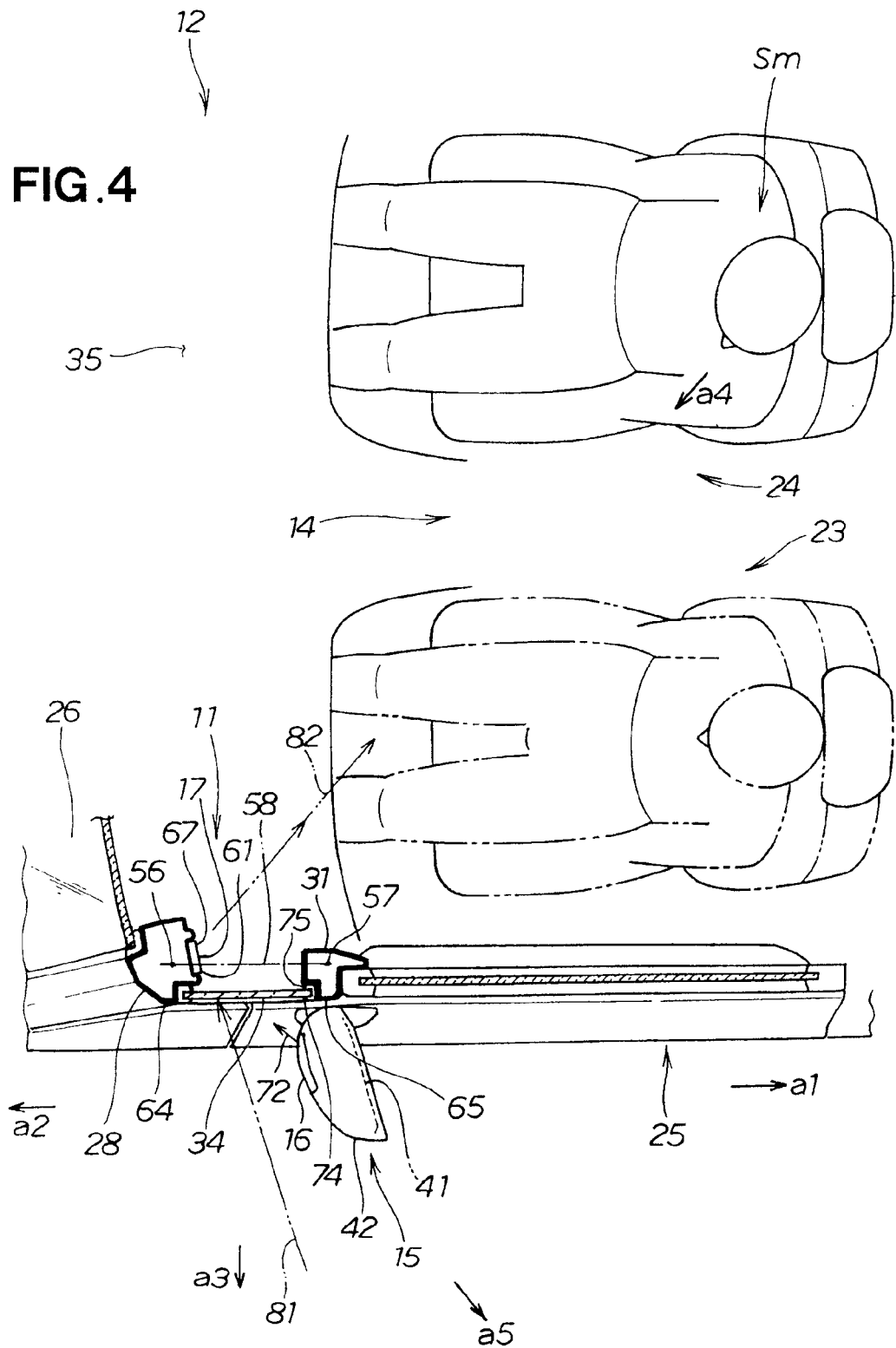
FIG. 4 is an enlarged sectional view taken along line 4-4 of FIG. 1.

In this regard, when the driver Sm looks at the second reflective mirror 17 (along arrow a4) in the viewing apparatus 11 as shown in FIG. 4, light 81 incident on the second reflective mirror 17 from outside and to the left of the vehicle is not readily reflected to form reflected light 82, and visibility is enhanced.

Specifically, when the sub-window pane 34 is disposed toward the external surfaces 64, 65 of the front pillar 28 and the sub-pillar 31, respectively, the second reflective mirror 17 can be placed closer to the first reflective mirror 16 in the vehicle width direction, and the angle of the second reflective mirror 17 toward the first reflective mirror 16 is reduced. In other words, the angle at which the second reflective mirror 17 is tilted toward the left outside of the vehicle body (along arrow a5) is reduced, or there is no longer a need for the second reflective mirror 17 to face toward the left outside of the vehicle body (in the direction of arrow a5). As a result, the light (incident light) 81 from outside the vehicle 12, where the first reflective mirror 16 is disposed, does not readily reflect toward the driver Sm.

Moreover, as shown in FIGS. 1 and 2, when the driver Sm looks at the second reflective mirror 17 (along line a4 of FIGS. 4 and 5), light 83 from above and outside the vehicle is not readily reflected by the second reflective mirror 17 to form reflected light 84, and visibility is enhanced.

Specifically, when the height H1 of the first reflective mirror 16 and the height H2 of the second reflective mirror 17 are substantially the same, or in other words, when a line 88 through the vertical center 86 of the first reflective mirror 16 and the vertical center 87 of the second reflective mirror 17 is substantially horizontal as viewed from a side of the vehicle 12 (the perspective of FIG. 1), since the second reflective mirror 17 is not inclined upward in relation to the vehicle 12, the light (incident light) 83 from above the vehicle 12 is not readily reflected toward the driver Sm.

An operation for maintaining the visibility range of the oblique forward viewing apparatus 11 will next be described with reference to FIGS. 6A and 6B.

FIG. 6A is a view showing a state in which the black ceramic paste 75 provided on the peripheral edge of the sub-window pane 34 is displayed in the second reflective mirror 17.

FIG. 6B is a view showing the present embodiment, whereby little of the black ceramic paste 75 provided on the peripheral edge of the sub-window pane 34 is displayed in the second reflective mirror 17.

Thus, in the viewing apparatus 11 according to the present embodiment, the one end portion 71 of the instrument panel 35 is not displayed in the second reflective mirror 17 when the height of the one end portion 71 of the instrument panel 35, e.g., the height of the side toward the center pillar portion 32 of the front triangular open portion 33, is lower than the normal instrument panel height.

Furthermore, when the height H1 of the first reflective mirror 16 and the height H2 of the second reflective mirror 17 are substantially the same, light traveling toward the second reflective mirror 17 from the first reflective mirror 16 may interfere with the black ceramic paste 75 according to vehicle design and other conditions (FIG. 6A), but when the black ceramic paste 75 is moved downward, the black ceramic paste 75 is not displayed in the second reflective mirror 17.

Figure 7A:
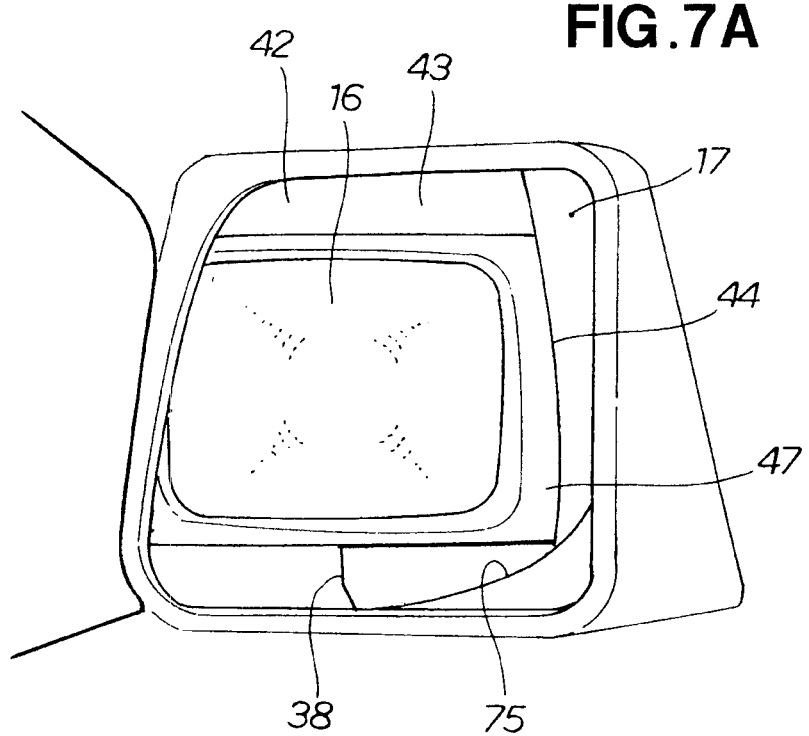
Figure 7B:
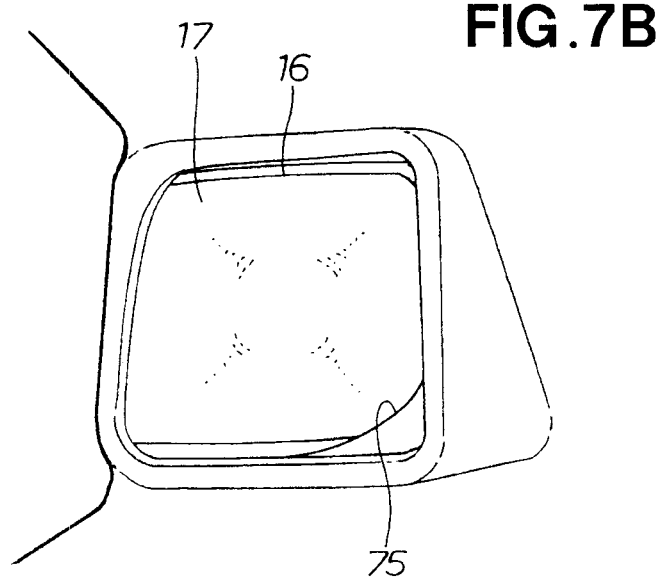
FIG. 7B is a view showing the second reflective mirror with a display area according to the present embodiment.

FIG. 7A is a view showing an example in which the second reflective mirror 17 has large vertical and horizontal dimensions and a large display area. FIG. 7B is a view showing the second reflective mirror 17 having the display area according to the present embodiment.

As shown in FIG. 7A, when the second reflective mirror 17 has a large display area, the mirror housing 42 is displayed in the second reflective mirror 17, light from behind the vehicle 12 is reflected by the second reflective mirror 17, and the image displayed in the second reflective mirror 17 is difficult for the driver to see.

In the second reflective mirror 17 according to the present embodiment shown in FIG. 7B, the second reflective mirror 17 has a small display area and therefore displays only the image displayed in the first reflective mirror, and the mirror housing 42 is not displayed.

In the viewing apparatus 11 according to the present embodiment, the second reflective mirror 17 is designed so as to have a display area of a size whereby only the first reflective mirror 16 is displayed, and the visibility of the second reflective mirror 17 can thereby be maintained.

Moreover, since the second reflective mirror 17 is designed to have a display area of a size whereby only the first reflective mirror 16 is displayed, the second reflective mirror 17 is not larger than necessary, and a front pillar 28 of a common thickness can be used.

In the front pillar 28, the sub-pillar 31 is formed extending downward from a midpoint on the front pillar 28, and the front pillar 28 is provided with a steel front pillar body 53, and a resin front pillar interior member 54 attached to an interior surface of the front pillar body 53. A pillar mirror mechanism 100 having the second reflective mirror (pillar mirror) 17 is attached to the front pillar interior member 54.

Figure 10:
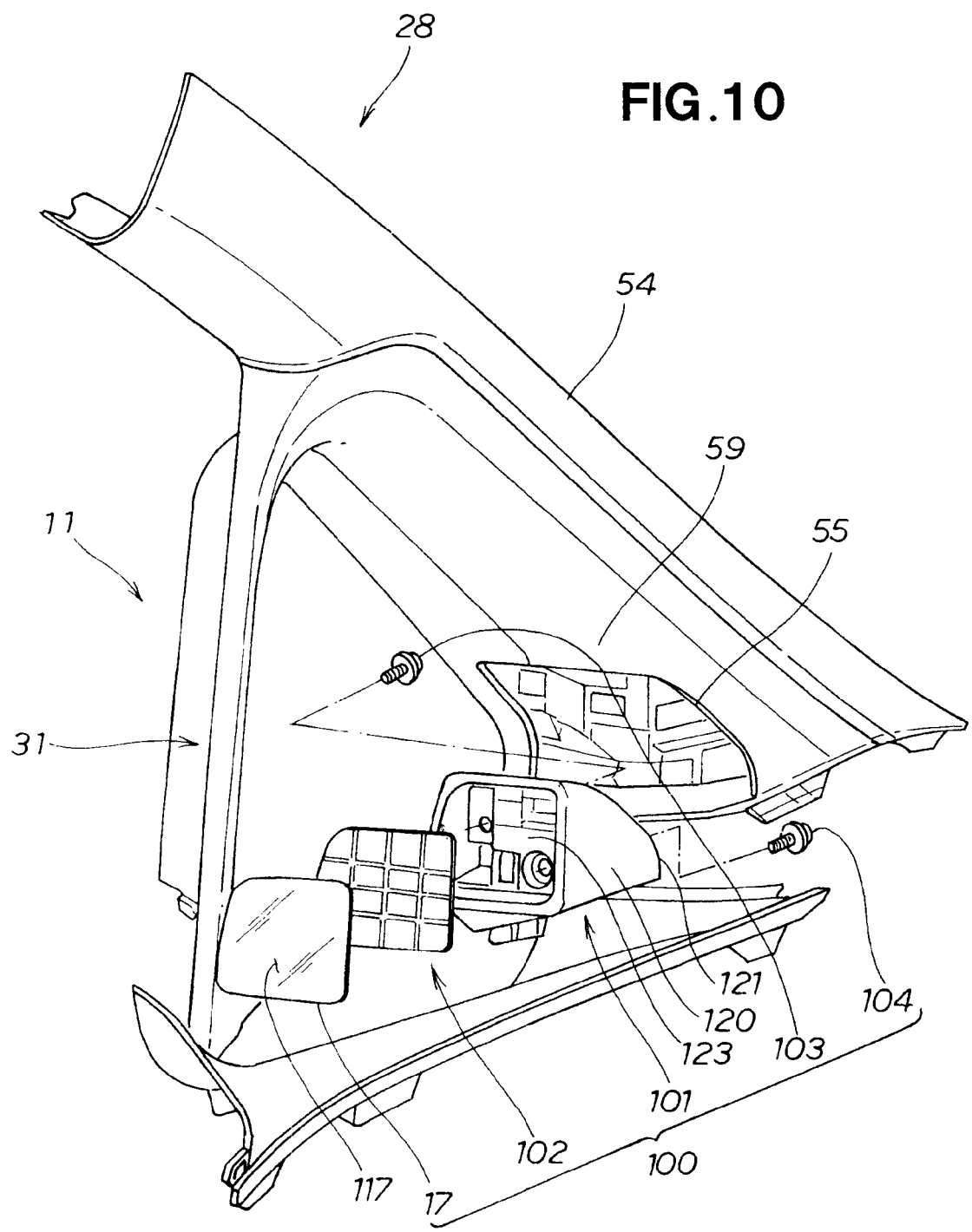
FIG. 10 is an exploded perspective view showing a pillar mirror mechanism with a pillar mirror as the second reflective mirror.

As shown in FIG. 10, the pillar mirror mechanism 100 is provided with a pillar mirror housing 101 attached to a mirror attachment part 55 formed in the front pillar interior member 54; a mirror holder 102; the pillar mirror 17; and upper male screw member 103 and lower male screw member 104 for fastening the mirror holder 102.

Details of the pillar mirror mechanism 100 will next be described with reference to FIGS. 8 through 15.

The pillar mirror mechanism 100 is provided with the second reflective mirror (pillar mirror) 17 for reflecting so as to enable the driver to view an area in front and to one side of the vehicle, and is disposed in the front pillar 28 for supporting the left and right ends of the front pane 26 of the vehicle 12. The pillar mirror mechanism 100 is also provided with the pillar mirror housing 101 for accommodating and retaining the second reflective mirror 17, the pillar mirror housing 101 being disposed on a surface 59 of the front pillar 28 in the interior of the passenger compartment, and a mirror holder 102 for retaining the second reflective mirror 17, the mirror holder 102 being attached on the inside of the pillar mirror housing 101.

Figure 12:
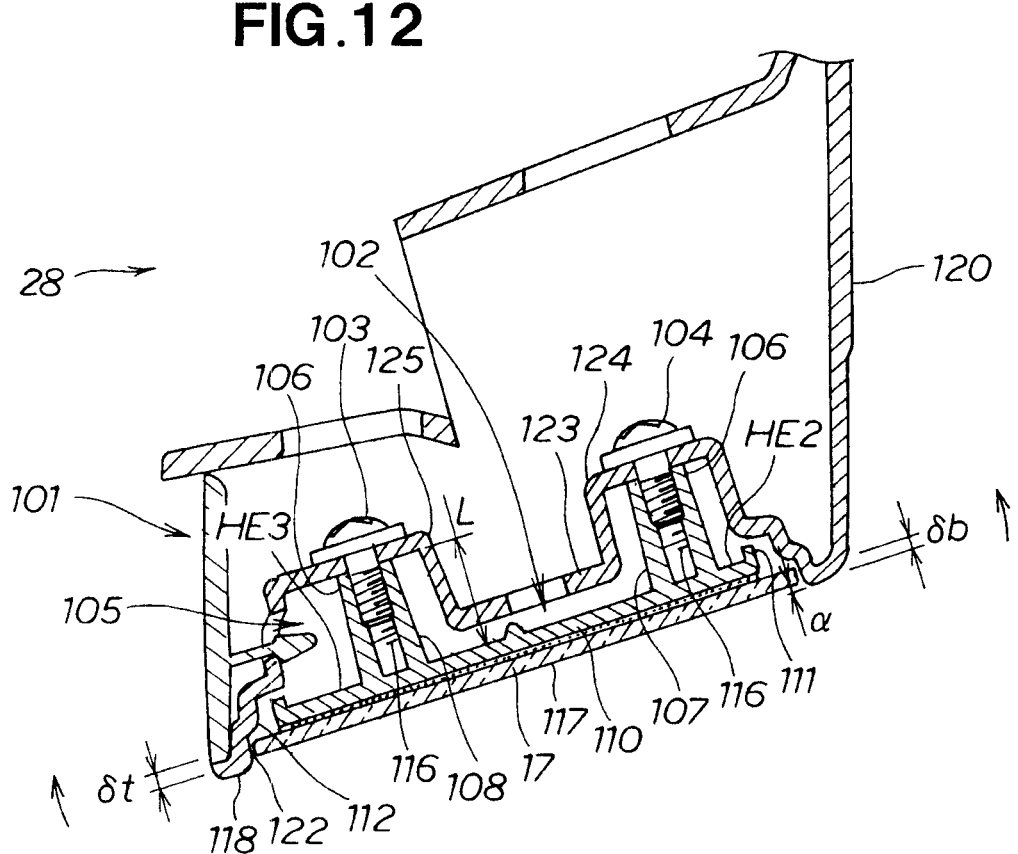
FIG. 12 is an enlarged sectional view taken along line 12-12 of FIG. 11.

The mirror holder 102 is provided with a boss part 105 protruding toward the inside the pillar mirror housing 101, as shown in FIG. 12. The boss part 105 has an adjustment margin 106 whereby the protrusion length L of the boss part 105 is adjusted to adjust the angle δt, δb of the retained second reflective mirror 17.

Figure 11:
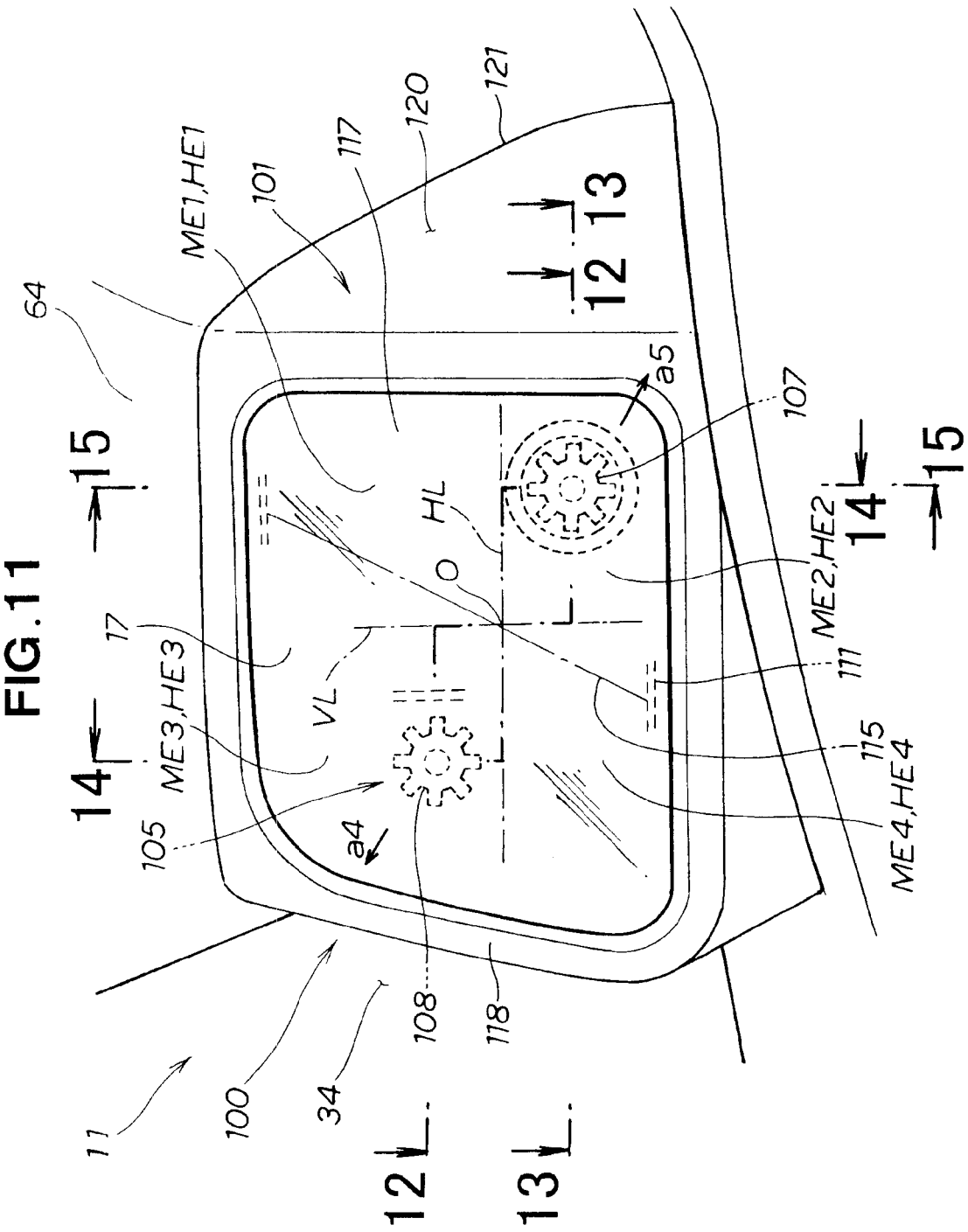
FIG. 11 is a view showing details of circled area 11 of FIG. 8.

At least two boss parts 105 are formed. One boss part 107 and the other boss part 108 are disposed in positions so as to be point-symmetrical about the intersection O of a horizontal center line HL and a vertical center line VL as viewed from in front of the second reflective mirror 17, as shown in FIG. 11.

In other words, when the second reflective mirror 17 as viewed from the front is divided into four areas by the horizontal line HL and the vertical line VL, and the areas are designated as an upper right area E1, a lower right area E2, an upper left area E3, and a lower left area E4, the one boss part (lower right boss part) 107 is positioned in the mirror holder 102 so as to correspond to the lower right area E2, and the other boss part (upper left boss part) 108 is positioned in the mirror holder 102 so as to correspond to the upper left area E3.

The mirror holder 102 has a mirror retaining plate 110 for retaining the second reflective mirror 17. The surface of the mirror retaining plate 110 is formed so as to be smaller than the surface of the second reflective mirror 17. A holder upper right area HE1, a holder lower right area HE2, a holder upper left area HE3, and a holder lower left area HE4 are set in the mirror retaining plate 110 so as to correspond to a mirror upper right area ME1, a mirror lower right area ME2, a mirror upper left area ME3, and a mirror lower left area ME4, respectively, of the second reflective mirror 17. One boss part (lower right boss part) 107 is formed on the back surface of the holder lower right area HE2 so as to protrude a predetermined length toward the front of the vehicle 12, and the other boss part (upper left boss part) 108 is formed on the back surface of the holder upper left area HE3 so as to protrude a predetermined length toward the front of the vehicle 12.

Figure 13:
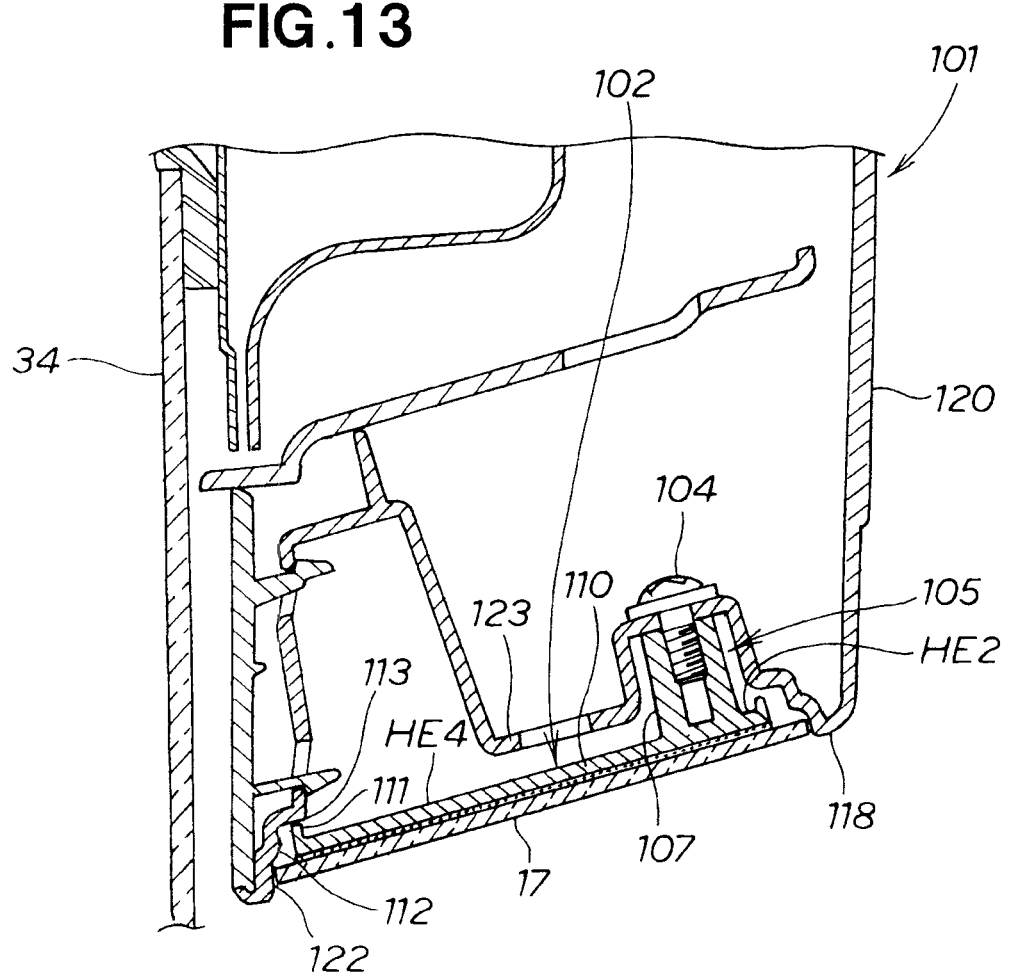
FIG. 13 is an enlarged sectional view taken along line 13-13 of FIG. 11.
Figure 14:
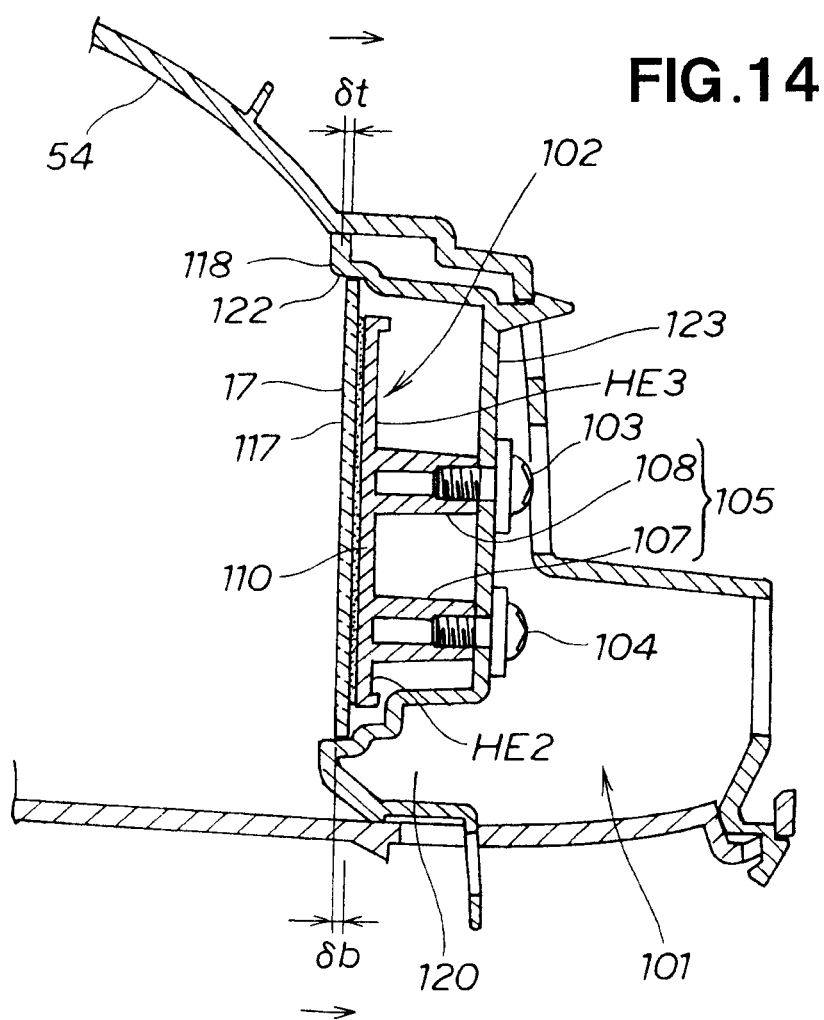
FIG. 14 is an enlarged sectional view taken along line 14-14 of FIG. 11.
Figure 15:
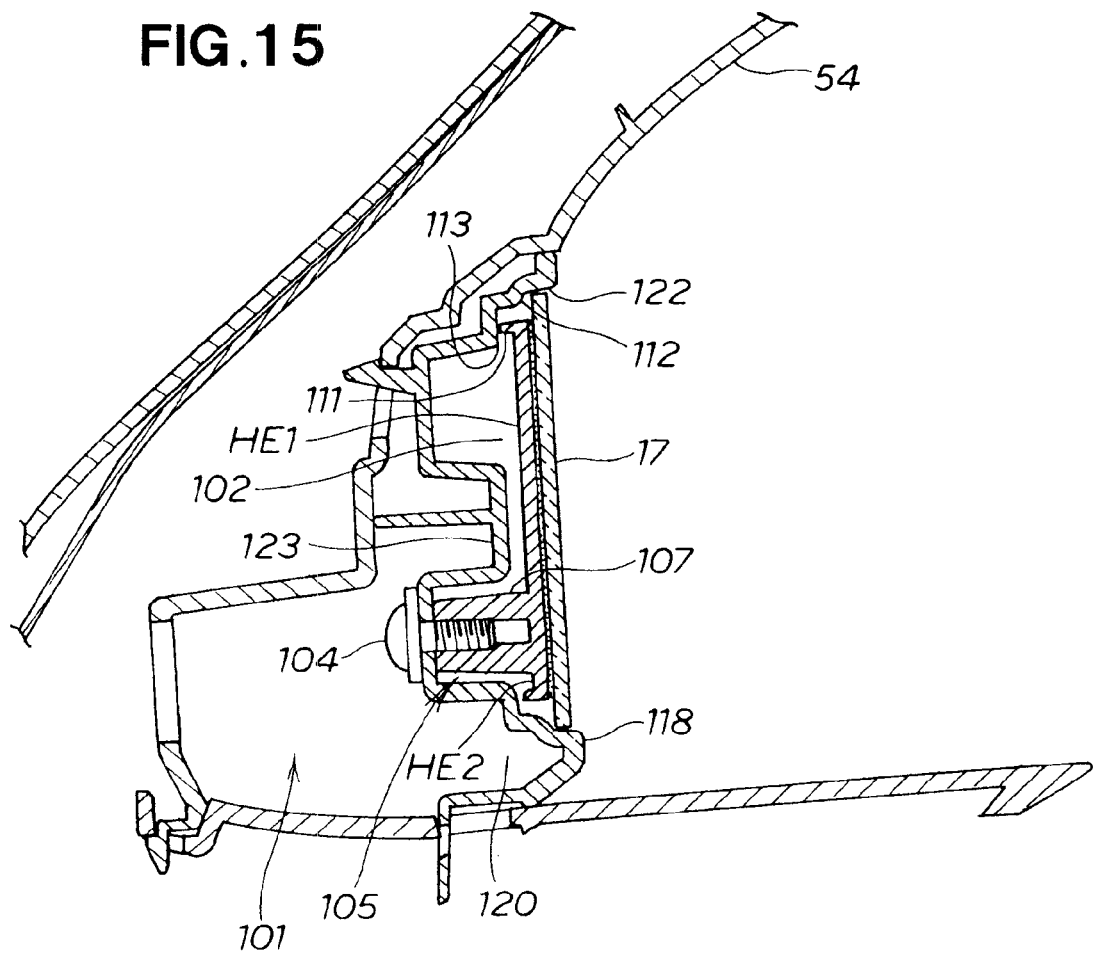
FIG. 15 is an enlarged sectional view taken along line 15-15 of FIG. 11.

A rib 111 is formed on the mirror retaining plate 110 along an edge of the back surface thereof. As shown in FIGS. 13 and 15, the portion of the rib 111 that is formed in the holder upper right area HE1 and the holder lower left area HE4 is in contact with a stopper part 113 formed in an open portion 112 of the pillar mirror housing 101, and a rotational axis line 115 (FIG. 11) of the second reflective mirror 17 is formed.

As shown in FIG. 12, a female screw part 116 corresponding to the lower male screw member 104 is formed in the lower right boss part 107. A female screw part 116 corresponding to the upper male screw member 103 is formed in the upper left boss part 108.

Concave portions or convex portions may be formed in the adjustment margins 106, 106 of the lower right and upper left boss parts 107, 108 to act as indicators when the adjustment margins 106, 106 are cut down.

The pillar mirror housing 101 has an open portion 112 formed by a peripheral edge portion 118 substantially flush with a reflective surface 117 of the second reflective mirror 17. The reflective surface 117 and the surface of the peripheral edge portion 118 have an allowable difference of 1 mm to 4 mm.

As shown in FIGS. 10 through 15, the pillar mirror housing 101 has a housing body 120. As part of the housing body 120, a front end portion 121 (FIGS. 10 and 11) positioned in the direction of the front of the vehicle 12 is formed so as to fit in the mirror attachment part 55 of the front pillar interior member 54. The open portion 112 formed so as to open toward the rear of the vehicle 12 is formed so as to decrease in size toward the front of the housing body 120 and the vehicle 12.

The pillar mirror housing 101 has a mirror fitting part 122 formed so that the second reflective mirror 17 fits with the peripheral edge portion 118. The stopper part 113 connected to the mirror fitting part 122 is formed having a flat shape and is in contact with the rib 111 of the mirror holder 102.

The housing body 120 has a bottom part 123, as shown in FIG. 12. The bottom part 123 has one cylinder part (lower right cylinder part) 124 and another cylinder part (upper left cylinder part) 125 that protrude in the forward direction of the vehicle. The one boss part (lower right boss part) 107 is positioned inside the one cylinder part 124 so that the distal end of the boss part 107 is in contact with the bottom part 123. The other boss part (upper left boss part) 108 is positioned in the other cylinder part 125 so that the distal end of the boss part 108 is in contact with the bottom part 123. The lower right cylinder part 124 has a hole formed for the lower male screw member 104 to pass through. The upper left cylinder part 125 has a hole formed for the upper male screw member 103 to pass through. The pillar mirror housing 101 is black.

Figure 9:
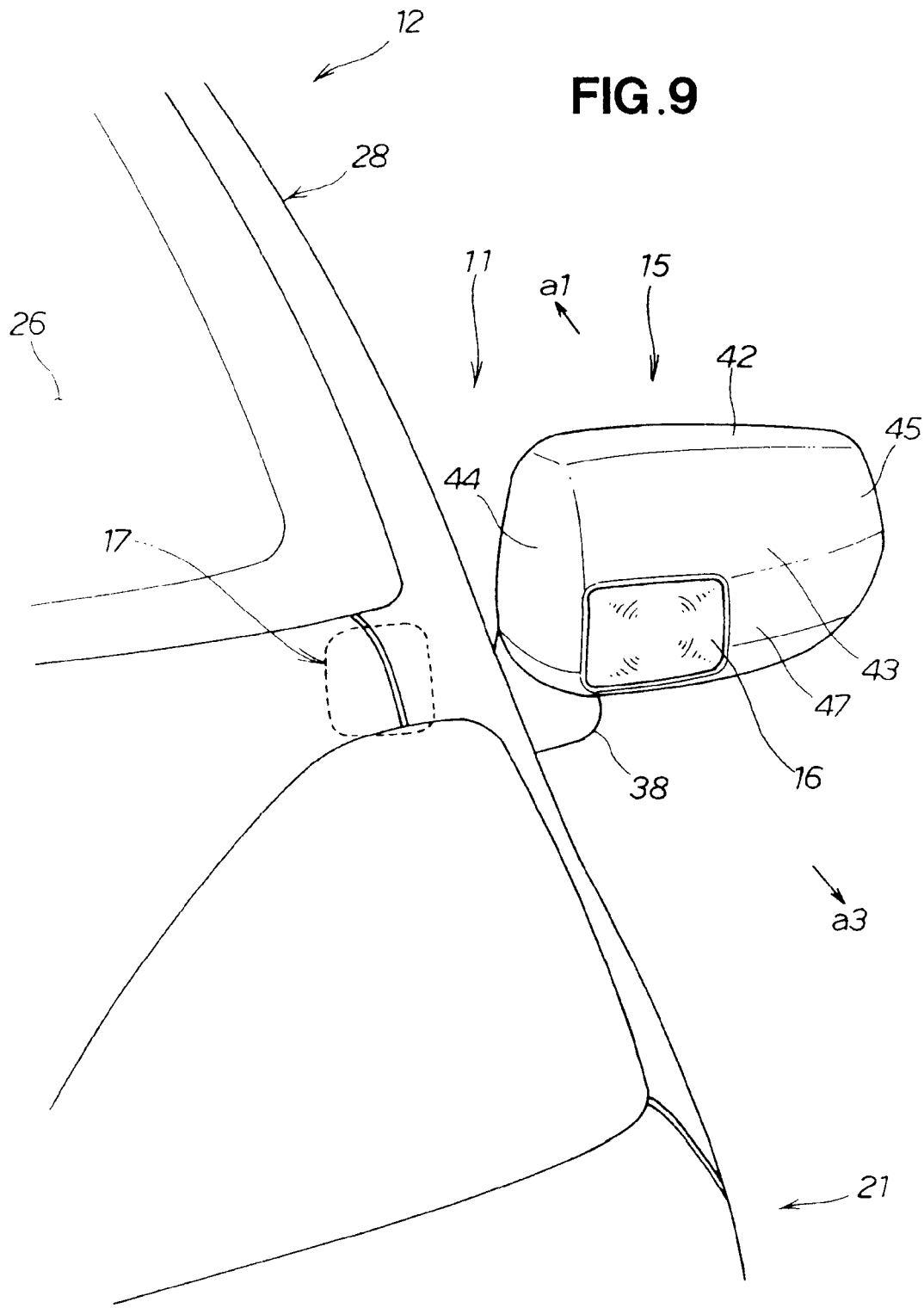
FIG. 9 is a front view showing the door mirror of FIG. 8.

In the apparatus 11 for viewing an area in front and to one side of a vehicle as described above, the first reflective mirror (housing mirror) 16 is provided so as to reflect a first object 51 and second object 52 (FIG. 5) in an area in front and to one side of the vehicle 12 toward the second reflective mirror 17 is provided to the mirror housing 42 of the door mirror 15 for enabling the rear of the vehicle 12 to be viewed, as shown in FIGS. 8 and 9. The angle of the second reflective mirror 17 is set by the boss part 105 so that the image from the first reflective mirror 16 is reflected toward the driver.

The manner in which the pillar mirror mechanism 100 is attached to the front pillar will next be briefly described.

In a first step, the pillar mirror mechanism 100 is assembled.

First, the second reflective mirror (pillar mirror) 17 is attached to the mirror holder 102.

Next, the mirror holder 102 to which the second reflective mirror 17 is attached is attached to the pillar mirror housing 101 by the upper male screw member 103 and the lower male screw member 104, thereby completing the pillar mirror mechanism 100.

The pillar mirror mechanism 100 is attached to the mirror attachment part 55 of the front pillar interior member 54.

The front pillar interior member 54 is then attached to the front pillar body 53 of the vehicle body. The lower end of the front pillar interior member 54 is inserted into the instrument panel 35, and the front pillar interior member 54 is assembled with the front pillar body 53.

When the front pillar interior member 54 is attached to the front pillar body 53, a misalignment (variation) occurs in the attachment position of the front pillar interior member 54. However, since the front pillar interior member 54 is attached within an allowable range of positional misalignment, the front pillar interior member 54 is sometimes attached at the upper limit position or the lower limit position of the allowable range, and the range reflected in the pillar mirror mechanism 100 is sometimes shifted.

In a second step, the angle (direction) of the second reflective mirror 17 is adjusted.

First, an assembly worker sits in the driver seat and confirms whether the desired image is displayed in the second reflective mirror 17. For example, a second reflective mirror 17 that displays the first object 51 and second object 52 or a range such as the one shown in FIG. 17 has no need of angle adjustment, and the second step is therefore completed.

Figure 17:
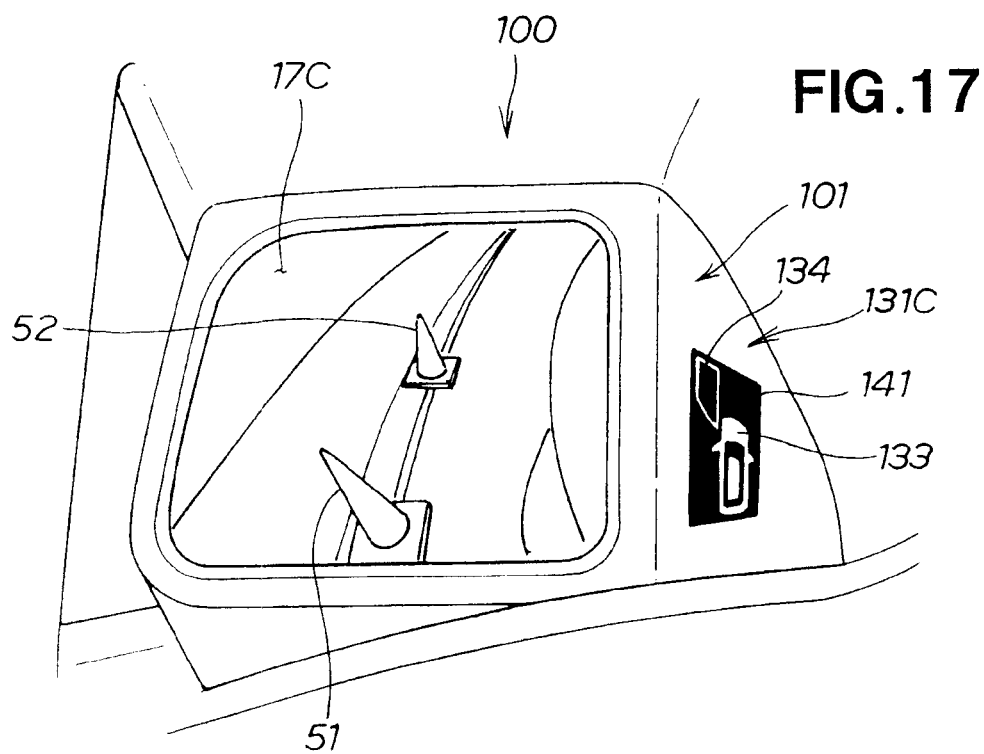
FIG. 17 is a view showing a second reflective mirror according to a third embodiment of the present invention.

In a case in which the objects or an area such as the one shown in FIG. 17 is not displayed, however, when a large percentage of the front body 21 is displayed, and only the area near the front body 21 is displayed, for example, the angle (direction) of the second reflective mirror 17 must be adjusted.

In such a case, the pillar mirror mechanism 100 is first removed from the front pillar interior member 54, and the upper and lower male screw members 103, 104 are loosened.

The mirror holder 102 is then removed from the pillar mirror housing 101, the adjustment margin 106 of the other boss part (upper left boss part) 108 is cut down by the desired length, and the height of the upper left boss part 108 is reduced.

The upper left boss part 108 is thus lowered, and thereby reduced to a degree that the rib 111 touches the stopper part 113 when the rib 111 of the mirror holder 102 interferes with the stopper part 113 of the open portion 112 formed in the pillar mirror housing 101.

Next, the mirror holder 102 is fitted in the pillar mirror housing 101, and the upper and lower male screw members 103, 104 are tightened from the back side of the mirror holder 102.

The pillar mirror mechanism 100 is then attached to the front pillar interior member 54, and the results of angle adjustment are confirmed. It is reconfirmed whether the objects or range such as that indicated in FIG. 17 are displayed in the second reflective mirror 17, and the first cycle of angle adjustment is completed for the second reflective mirror 17.

In cases in which the angle remains inadequate, a second cycle of the second step is started.

In the second step, the opposite angle is adjusted. In a case in which almost none of the front body 21 is displayed, and a range removed from the front body 21 is displayed, the adjustment margin 106 of the one boss part (lower right boss part) 107 is cut down by the desired length, and the height of the lower right boss part 107 is reduced.

An operation of the pillar mirror mechanism 100 will next be described.

In the pillar mirror mechanism 100, when the protrusion length is adjusted by the adjustment margin 106 provided to the boss part 105 in this manner, i.e., when the protrusion length L is reduced by cutting down the adjustment margin 106, the angles $\delta t$, $\delta b$ of the second reflective mirror 17 change, and the angle of the second reflective mirror 17 can therefore be adjusted.

Specifically, when the adjustment margin 106 of the other boss part (upper left boss part) 108 is cut down by the desired length to lower the upper left boss part 108, the second reflective mirror 17 faces in the direction 30° upward and to the left in FIG. 11 (in the direction of arrow a4), i.e., upward and toward the outside of the vehicle 12. In other words, the angle $\delta t$ of the second reflective mirror 17 increases, a smaller ratio of the front body 21 is therefore displayed, and an area accordingly more removed from the front body 21 is displayed.

In contrast, when the adjustment margin 106 of the one boss part (lower right boss part) 107 is cut down by the desired length to lower the lower right boss part 107, the second reflective mirror 17 faces in the direction 30° downward and to the right (in the direction of arrow a5), i.e., downward and toward the inside of the vehicle 12. In other words, the angle $\delta b$ of the second reflective mirror 17 increases, a larger ratio of the front body 21 is therefore displayed, and a smaller range of the area removed from the front body 21 is displayed.

The direction 30° upward and to the left in FIG. 11 (in the direction of arrow a4) adjusted by the upper left boss part 108, and the direction 30° downward and to the right (in the direction of arrow a5) adjusted by the lower right boss part 107 are movement paths that follow the difference in eye height between drivers having large and small heights/body types.

As a result, it is possible to absorb variations in the shape of the front pillar interior member 54 or the instrument panel 35 during resin molding, or variations that occur when the front pillar interior member 54 is assembled with the front pillar body 53 of the vehicle body, and to absorb allowable error that occurs during the manufacturing process. Adjustment of the angle $\delta t$, $\delta b$ of the second reflective mirror 17 is also simplified.

As the angle (direction) of the second reflective mirror 17 begins to change, the fit depth $\alpha$ (FIG. 12) of the second reflective mirror 17 in the mirror fitting part 122 of the open portion 112 increases, and the amount of level difference (fit depth $\alpha$) from the peripheral edge portion 118 to the reflective surface 117 of the second reflective mirror 17 increases. However, no gap is formed between the reflective surface 117 and the pillar mirror housing 101, and an attractive appearance is maintained. Specifically, since the edges of the reflective surface 117 and the pillar mirror housing 101 do not overlap, no gaps form even when the angles δt, δb are increased.

Furthermore, even when there is a large level difference (fit depth a) from the peripheral edge portion 118 to the reflective surface 117 of the second reflective mirror 17 the black color of the pillar mirror housing 101 makes the level difference less noticeable.

Second Embodiment

Figure 16:
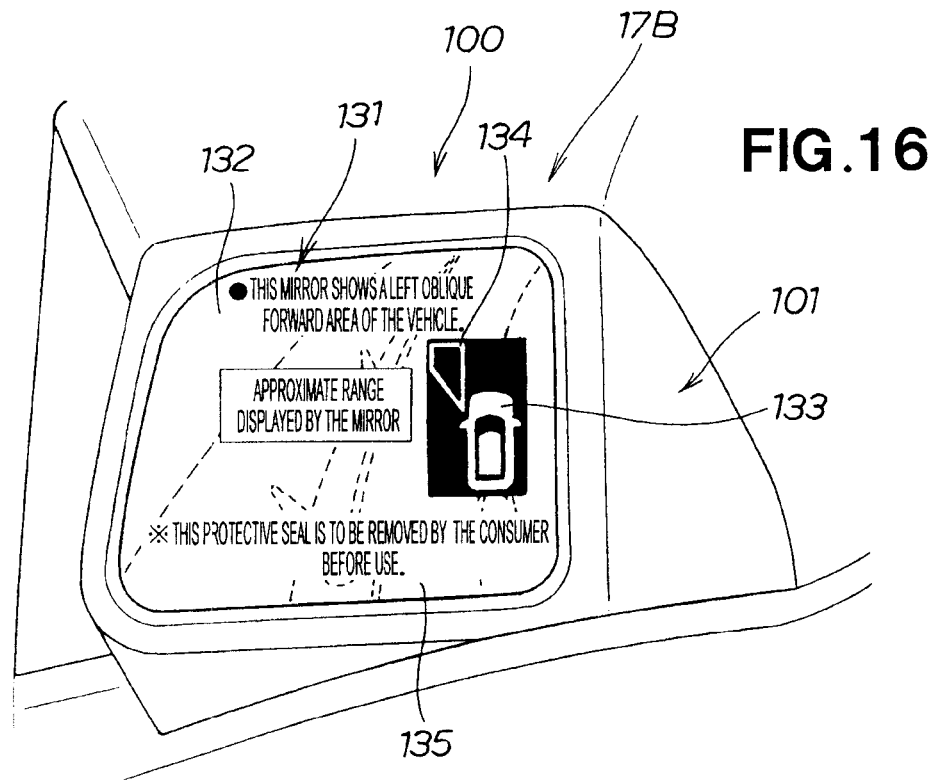
FIG. 16 is a view showing a second reflective mirror according to a second embodiment of the present invention.

A second reflective mirror 17B according to a second embodiment will next be described based on FIG. 16.

In the second reflective mirror 17B according to the second embodiment, a visible range displaying means 131 for notifying the driver of a visible range of the area in front and to one side of the vehicle is provided to the reflective surface 117.

The visible range displaying means 131 is composed of a transparent protective sheet 132 bonded to the entire reflective surface 117 of the second reflective mirror 17B, a vehicle symbol 133 representing the vehicle 12 as viewed from above in the protective sheet 132, a visible range symbol 134 depicting the area that can be viewed from the second reflective mirror 17B, and a description part 135 that includes written instructions.

In the second reflective mirror 17B according to the second embodiment, the driver can understand the function of the second reflective mirror 17B by looking at the visible range displaying means 131. In other words, the driver can be notified of the visible range displayed in the second reflective mirror 17B.

Third Embodiment

The second reflective mirror 17C according to a third embodiment will next be described based on FIG. 17.

In the second reflective mirror 17C according to the third embodiment, a visible range displaying means 131C is provided to the pillar mirror housing 101.

The visible range displaying means 131C is composed of a bondable sheet 141, a vehicle symbol 133 drawn on the sheet 141, and a visible range symbol 134.

The second reflective mirror 17C according to the third embodiment of the present invention operates in the same manner and produces the same advantageous effects as the second reflective mirror 17B according to the second embodiment of the present invention. In other words, the driver can be notified of the visible range displayed in the second reflective mirror 17C.

Obviously, various minor changes and modifications of the present invention are possible in light of the above teaching. It is therefore to be understood that within the scope of the appended claims the invention may be practiced otherwise than as specifically described.

What is claimed is:

1. An apparatus for viewing an oblique forward area of a vehicle, comprising:
 a sub-window pane, supported by a front pillar of the vehicle and a sub-pillar extending downwardly from partway along the front pillar, for separating an inside and outside of a passenger compartment;
 a mirror housing disposed in a vicinity of the sub-window pane and housing a door mirror for displaying a rear of the vehicle;
 a first reflective mirror, provided on a front surface of the mirror housing, for displaying the oblique forward area of the vehicle; and
 a second reflective mirror, disposed on a surface of the front pillar exposed to an interior of the passenger compartment, for displaying the oblique forward area of the vehicle by reflecting light reflected by the first reflective mirror toward a vehicle occupant through the sub-window pane;
 wherein the sub-window pane is disposed further outward in a vehicle widthwise direction than a line passing over cross-sectional vehicle-widthwise direction centers of the front pillar and the sub-pillar, and the second reflective mirror has an outside edge positioned in a vicinity of the sub-window pane.

2. The viewing apparatus of claim 1, wherein the sub-window pane is disposed such that an external surface of the sub-window pane is substantially flush with an external surface of the front pillar and an external surface of the sub-pillar.

3. The viewing apparatus of claim 1, wherein the second reflective mirror has an inside edge positioned further inward in the vehicle widthwise direction than the outside edge, the inside edge being positioned further inward in the vehicle widthwise direction than the line passing over the cross-sectional vehicle-widthwise direction centers of the front pillar and the sub-pillar.

4. The viewing apparatus of claim 1, wherein the second reflective mirror is disposed at a substantially equal height to a height of the first reflective mirror.

5. The viewing apparatus of claim 1, wherein the front pillar is disposed on left and right sides of the vehicle, and an instrument panel is disposed between the left and right front pillars, at least one end portion of the instrument panel located closely to a front passenger seat being positioned so as not to interfere with reflected light traveling from the first reflective mirror to the second reflective mirror.

6. The viewing apparatus of claim 1, wherein the front pillar is disposed on left and right sides of the vehicle, and an instrument panel is disposed between the left and right front pillars, at least one end portion of the instrument panel located closely to a front passenger seat being formed so as to be lower in a vertical direction than a vehicle-widthwise direction center portion of the instrument panel and being positioned at a height so as not to interfere with reflected light traveling from the first reflective mirror to the second reflective mirror.

7. The viewing apparatus of claim 1, wherein a black ceramic paste is provided to a peripheral edge portion of the sub-window pane, and the black ceramic paste is baked so as not to interfere with reflected light traveling from the first reflective mirror to the second reflective mirror.

8. The viewing apparatus of claim 1, wherein the second reflective mirror has longitudinal and transverse lengths set so that the second reflective mirror displays only the first reflective mirror.

9. An apparatus for viewing an oblique forward area of a vehicle, comprising:
 a sub-window pane supported by a front pillar of the vehicle and a sub-pillar extending downward from partway along the front pillar, the sub-window pane separating an inside and outside of a passenger compartment;
 a mirror housing disposed in a vicinity of the sub-window pane and housing a door mirror for displaying a rear of the vehicle;
 a housing mirror, provided on a front surface of the mirror housing, for displaying the oblique forward area of the vehicle; and
 a pillar mirror mechanism having a pillar mirror, provided on that surface of the front pillar which is exposed to an interior of the passenger compartment, for displaying the oblique forward area of the vehicle by reflecting light reflected by the housing mirror toward a vehicle occupant via the sub-window pane, wherein the pillar mirror mechanism comprises a pillar mirror housing disposed on a surface of the front pillar in the interior of the passenger compartment, and a mirror holder, attached to inside of the pillar mirror housing, for retaining the pillar mirror, the mirror holder is provided with a boss part that protrudes toward the inside of the pillar mirror housing, and the boss part has an adjustment margin whereby an angle of the retained pillar mirror is adjusted by adjusting a protrusion length of the boss part.

10. The viewing apparatus of claim 9, wherein at least two boss parts are formed, and the two boss parts are disposed in positions so as to be point-symmetrical about an intersection of a horizontal center line and a vertical center line of the mirror holder.

11. The viewing apparatus of claim 10, wherein the pillar mirror is divided into four areas designated as an upper right area, a lower right area, an upper left area and a lower left area, and one of the boss parts is disposed in the mirror holder so as to correspond to the lower right area while the other boss part is disposed in the mirror holder so as to correspond to the upper left area.

12. The viewing apparatus of claim 9, wherein the pillar mirror housing is provided with an open portion having a peripheral edge portion substantially flush with a reflective surface of the pillar mirror.

13. The viewing apparatus of claim 9, wherein the pillar mirror housing is black.

14. The viewing apparatus of claim 9, wherein one of the pillar mirror and the pillar mirror housing is provided with visible range displaying means for notifying a vehicle occupant of a visible range of the oblique forward area of the vehicle viewed via the housing mirror.

* * * * *